Jan. 27, 1970  KOTARO MURANAGA  3,492,543
AUTOMATIC DEGAUSSING APPARATUS
Filed May 22, 1967  4 Sheets-Sheet 1

United States Patent Office 3,492,543
Patented Jan. 27, 1970

3,492,543
AUTOMATIC DEGAUSSING APPARATUS
Kotaro Muranaga, Yokohama, Japan, assignor to Victor Company of Japan, Limited, Kanagawa-ku, Yokohama, Japan
Filed May 22, 1967, Ser. No. 640,074
Claims priority, application Japan, May 30, 1966, 41/49,914; Aug. 9, 1966, 41/51,862; Jan. 25, 1967, 42/6,087
Int. Cl. H01h *47/00;* H01f *13/00*
U.S. Cl. 317—157.5                     12 Claims

ABSTRACT OF THE DISCLOSURE

It is disclosed that an automatic degaussing apparatus comprising a bridge circuit composed of a thermal sensitive resistor element of positive characteristics having a positive and high temperature coefficient and impedances of proper value, a degaussing coil mounted in the bridge proper of said bridge circuit and carrying an electric current when said bridge circuit is unbalanced to thereby cancel out magnetism of magnetized objects, and means for supplying a voltage to said bridge circuit, the value of said thermal sensitive resistor element of positive characteristics being selected such that said bridge circuit is unbalanced for an instant after a voltage is applied thereto but becomes balanced in a steady state as changes occur in the impedance of said thermal sensitive resistor element of positive characteristics. Such automatic degaussing apparatus uses no thermistors or varistors and provides for prompt and positive demagnetization of magnetized objects.

---

This invention relates to an automatic degaussing apparatus, more particular to an automatic degaussing apparatus for automatically cancelling out magnetism picked up by the shadow-mask of a color television tube and surrounding parts thereof.

In one apparatus known in the art of degaussing, a surge current is used and a thermistor or varistor is employed in combination with other elements in the degaussing circuit. The disadvantages of this type of degaussing apparatus are that thermistors and varistors are liable to be damaged thermally and electrically, and that since a surge current is used, it becomes necessary to effect changes in the value of thermistors or varistors if there is any change in its power circuit.

According to the present invention, on the contrary, degaussing can be effected by using an AC impedance bridge network comprising a resistor element having a positive and high temperature coefficient or compound resistor elements thereof as its component elements, and selecting the impedance of the bridge network in such a way that when the bridge network becomes balanced in a steady state following transient characteristics, the value of an electric current flowed through a degaussing coil mounted in the bridge proper of said bridge network becomes negligibly small. The invention can positively obviate the aforementioned disadvantages of the apparatus of prior art, since neither a surge current nor a thermistor (or varistor) is used.

A principal object of the present invention is to provide an automatic degaussing apparatus for automatically and positively cancelling out magnetism required to be removed from component parts of electric appliances, especially shadow-masks of color tubes and surrounding parts of color television sets and color television monitors by applying a power source voltage, instead of using a surge current in a circuit composed of the combination of an inductance, a capacitance, a rectifier circuit and a thermistor or varistor.

Another object of the invention is to provide an automatic degaussing apparatus which uses a bridge circuit composed of a thermal sensitive resistor element having a positive and high temperature coefficient to effect degaussing of magnetism picked up by component parts of electric appliances.

A further object is to provide an automatic degaussing apparatus which uses a bridge circuit composed of a plurality of thermal sensitive resistor elements having a positive and high temperature coefficient, the elements being compounded in such a manner as to transmit heat generated in the elements to one another in order to effect prompt and positive degaussing of magnetized parts.

Other objects and features of the invention will become apparent when the following disclosure is considered in conjunction with the accompanying drawings, in which.

Figure 1:
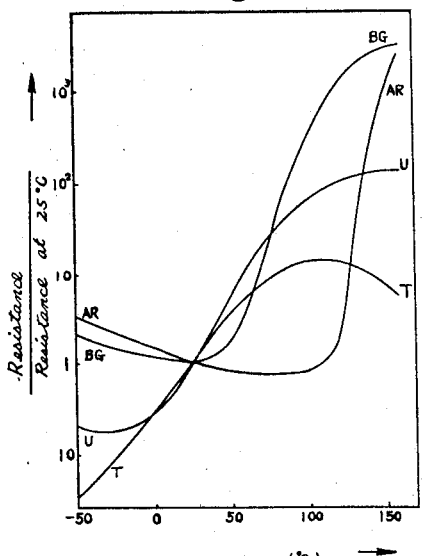
FIGURE 1 is a diagram showing one example of resistance-temperature characteristics of a thermal sensitive element of positive characteristics.

First of all, I should like to give an explanation of the thermal sensitive resistor element of positive characteristics used in the present invention. Thermistors have hitherto been well known as thermal sensitive elements used for temperature compensation in electric circuits. The elements known as thermistors are characterized by their having negative resistance-temperature characteristics, that is an increase of temperature results in a relative decrease of resistance value. On the other hand, thermal sensitive elements having positive resistance-temperature characteristics, have been recently found. Some of them have resistance-temperature characteristics in which the resistance value is increased rapidly relative to the temperature above a certain value or varied linearly with a large temperature coefficient, as shown in FIG. 1. A principal component of such thermal sensitive elements having positive resistance-temperature characteristics (also known as a posistor) is a semiconductor of barium titanate.

Barium titanate ceramic, known as a strong dielectric, has normally a specific resistance over $10^{10}\Omega$ cm., but when small amounts of additives are added to it, a kind of semi-conductor in which the specific resistance under a standard temperature is within $10$–$10^8\Omega$ cm. can be obtained. The specific resistance of said semi-conductor begins to increase rapidly above about 120° C., as shown in FIG. 1 by a curve AR, and there are occasions when its changing rate reaches 60%/° C. If various formulations are made by replacing the elements making up barium titanate with other elements, materials having different characteristics from each other, as shown in FIG. 1, can be obtained.

The thermal sensitive elements have various resistance-temperature characteristics, and they may be divided into three broad classes, that is, (1) a resistance-temperature characteristic wherein the temperature coefficient is 30–60%/° C. at a constant temperature (generally, over 100° C.) and the resistance value increases a thousandfold or ten thousandfold at the temperature of 120–130°

C. as shown in FIG. 1 by a curve AR, (2) a resistance-temperature characteristic as a curve BG in which the resistance begins to increase above a certain temperature (0–100° C., for example, 50° C. in the embodiment in FIG. 1) but the changing rate thereof is not so large as the curve AR, and (3) a resistance-temperature characteristic wherein the logarithm of resistance value is substantially proportioned to the temperature in the range of a used temperature before and after standard temperature as curves T and U. Thus, it is possible to select a thermal sensitive element having proper characteristics in accordance with the temperature used.

Generally, a resistor having negative characteristics shows a lowering of resistance value as self-heating begins due to the electric current passing therethrough. This results in an increase in the value of current and an accelerated state is ushered in, ending in the resistor being damaged. This is the phenomenon referred to as runaway. In the case of a resistor of positive characteristics, however, such runaway does not occur because a current is suppressed when self-heating takes place. This makes a thermal sensitive element of positive characteristics less limited in use and have a wider range of applications.

One embodiment of the apparatus according to this invention will now be explained with reference to FIGURE 2, in which 11 is a power source plug; 12 is a fuse; 13 is a power source switch; 14 generally designates the circuits of an equipment proper; 15 is a degaussing coil of inductance $L_1$; 16, 17 and 18 are conventional impedances having the values $Z_1$, $Z_2$ and $Z_3$, respectively; and 19 is a thermal sensitive resistor element having a positive and high temperature coefficient.

The elements 16, 17, 18 and 19 form a bridge circuit which will become balanced and the degaussing coil 15 inserted between the bridge ends will carry no current if the following relation holds between the above-mentioned impedances:

$$Z_1 Z_3 = Z_2 Z_4 \qquad (1)$$

If, therefore, the impedances $Z_1$, $Z_2$, $Z_3$ and $Z_4$ of the bridge are selected such that at the initial stages following switch-in the above-mentioned formula does not hold but a current flowed through the normal sensitive element 19 causes its resistance value to rise with time until a steady state is reached when the Formula 1 holds, it will be possible to cause a damped current to flow through the degaussing coil 15. Thus, it will be possible to effect degaussing of magnetized parts by means of the degaussing coil 15.

Figure 3:
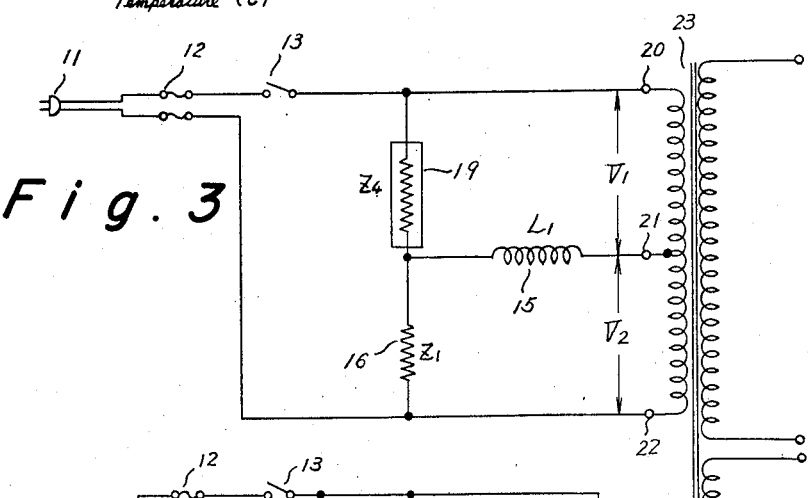
FIGURES 2 and 3 show electrical circuits of embodiments of the apparatus according to this invention.

Another embodiment of the apparatus according to this invention will next be described with reference to FIGURE 3 in which like reference characters designate similar parts in FIGURE 2. In FIGURE 3, 23 designates a power transformer of an electric appliance. Let us assume that power source (not shown) required for actuating the appliance is connected to the secondary winding side. If an impedance between terminals 20 and 21 of the primary winding of power transformer 23 is of $Z'_3$ with respect to the transformer and between terminals 21 and 22 is of $Z'_2$ with respect to the transformer, $Z'_2$ and $Z'_3$ will correspond to $Z_2$ and $Z_3$ of FIGURE 2, respectively. Since, however, the load of electric appliance is connected to the transformer in this instance, it is possible to select the impedance values $Z_1$ and $Z_4$ such that the impedance values $Z'_2$ and $Z'_3$ are generally very low as compared with the impedance values $Z_1$ and $Z_4$ in a steady state, respectively. Thus, the following relations will hold:

$$Z'_2 \ll Z_1 \qquad Z'_3 \ll Z_4 \qquad (2)$$

Figure 4:
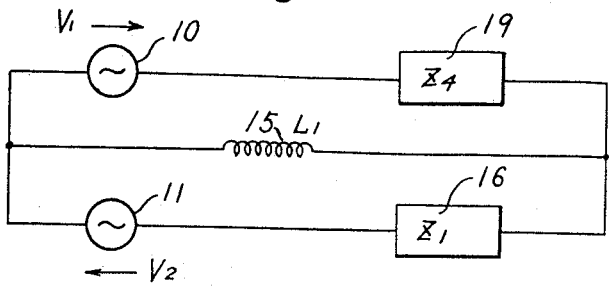
FIGURE 4 is a circuit equivalent to the circuit of FIGURE 3.

If, therefore, the values $Z'_2$ and $Z'_3$ are disregarded with respect to the values $Z_1$ and $Z_4$ with the voltage across the terminals 20 and 21 being $V_1$ and the voltage across the terminals 21 and 22 being $V_2$, the equivalent circuit shown in FIGURE 4 can be obtained. If in this instance the values $V_1$ and $V_2$ and $Z_1$ and $Z_4$ are selected such that the following relation is satisfied, the degaussing coil 15 will carry no current:

$$V_1/Z_4 = V_2/Z_1 \qquad (3)$$

Accordingly, if the impedance of thermal sensitive resistor element of positive characteristics is selected such that it does not satisfy Formula 3 for an instant following switch-in but satisfies Formula 3 in a steady state following an increase of its resistance with time due to temperature rise caused by the current, a damped current will flow through the degaussing coil 15 to thereby cancel out magnetism of magnetized parts.

When the impedance value of a thermal sensitive resistor element of positive characteristics which satisfies Formula 1 or Formulas 2 and 3 is so high that it is impossible to incorporate this value in a single element, a plurality of these resistor elements connected in series must be used. In such an instance, these elements should have identical characteristics; otherwise the resistance value of a certain resistor element would show an increase because of differences in the capacity for self-heating between the elements, with the result that the terminal voltage of said particular element might exceed the rated value and said element might be damaged. Measures to cope with this situation will be explained in detail with reference to FIGURE 5. In the example shown, four thermal sensitive elements 41 to 44 connected in series are used, the elements 41 to 44 being connected together in intimate contact with one another. The elements 41 to 44 each have leads 45 to 49.

Let us assume that a voltage is applied between the leads 45 to 49 when the elements 41 to 44 each have unequal characteristics, with the capacity for self-heating of element 42 greater than the capacities of other elements 41, 43 and 44 and the elements not being disposed in intimate contact with one another. Then, the resistance value of element 42 will gradually increase and its terminal voltage will correspondingly increase. On the contrary, the terminal voltages of other elements 41, 43 and 44 will be reduced, so that the terminal voltage of element 42 will become nearly identical with the voltage applied between leads 45 and 49. If this voltage exceeds the rated value of element 42, element 42 will be damaged.

Figures 5, 6:
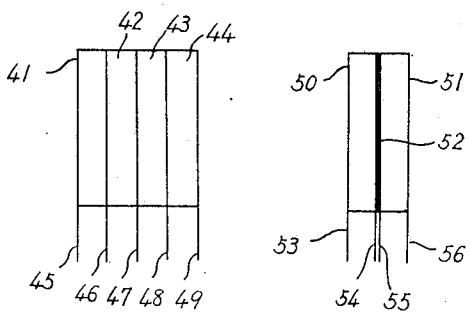
FIGURE 5 shows a plurality of thermal sensitive resistor elements of positive characteristics connected together in intimate contact with one another.
FIGURE 6 shows a plurality of thermal sensitive resistor elements described above connected together through an insulator interposed therebetween.

However, if thermal sensitive resistor elements of positive characteristics 41 to 44 are connected together in intimate contact with one another as shown in FIGURE 5, the heat generated by self-heating of element 42, for instance, will be transmitted to other elements 41, 43 and 44 by conduction of heat and raise the temperatures of these elements. This will result in an increase in the values of resistance of these elements and an attendant rise in their terminal voltages, so that the temperatures of elements 41, 43 and 44 will become equal to that of element 42 as a result of conduction of heat, although there may be a slight time lag. Thus, the terminal voltages of elements 41, 42, 43 and 44 can remain within the rated values.

In FIGURE 6 is shown another example of connecting together thermal sensitive resistor elements. As shown thermal sensitive resistor elements of positive characteristics 50 and 51 are connected together with an insulator 52 interposed therebetween, and said elements 50 and 51 have leads 53 and 54 and 55 and 56 attached thereto, respectively. If the difference in voltage between the elements 50 and 51 does not exceed the withstand voltage of the insulator between them, they may simply be held together in intimate contact with one another as in the example shown in FIGURE 5, so that heat can be transmitted to one another. In this instance, the characteristics of elements 50 and 51 are also equalized by conduction of heat through the insulator 52, but the elements 50 and 51 are not connected in series but are used as independance impedances as subsequently to be explained.

Figure 2:
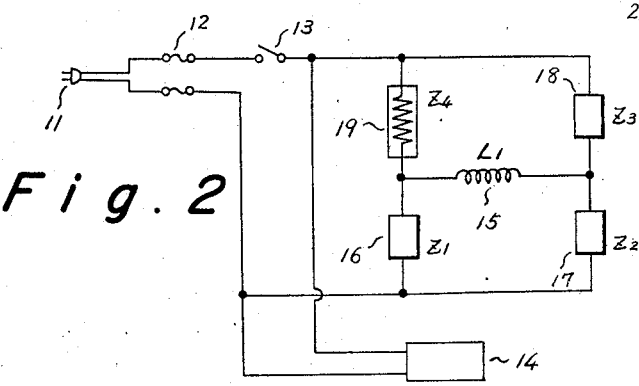
Figure 7:
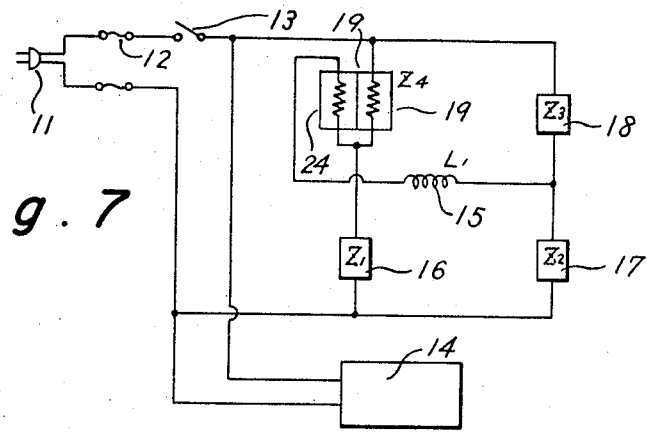
FIGURES 7, 8, 9, 10, 11, 12, 13 and 14 show electric circuits of other embodiments of the apparatus according to this invention, respectively.

The automatic degaussing apparatus shown in FIGURE 7 represents improvements in the automatic degaussing apparatus of FIGURE 2. If the thermal sensitive resistor element of positive characteristics were one which has voltage dependance characteristics, a high harmonic voltage of input voltage would appear on opposite ends of element 19 due to non-linearity of the resistance of said element, and the wave-form of a current flowing through the bridge would be a distorted sine wave. This would prevent the bridge network from attaining a perfect balance, making it impossible to achieve satisfactory degaussing effect.

Thermal sensitive resistor elements 24 and 19 of positive characteristics are the so-called compound elements disposed in such a manner as to be able to transfer the heat generated by them to one another. For an instance after a voltage is applied to this apparatus the bridge remains unbalanced because the resistance values of elements 19 and 24 are low and a current of considerable value flows through the degaussing coil 15 with time, however, the impedance of element 19 will rise due to the heat generated and the bridge will become nearly balanced with respect to the fundamental wave voltage. The element 24, on the other hand, will show an increase in temperature due to the heat generated by the element 19, and its resistance value will rise rapidly. Thus, the high harmonic current flowing through the degaussing coil in the bridge network due to the high harmonic voltage produced on opposite ends of the element 19 can be suppressed rapidly and reduced to a negligible value. This causes a damped AC current to flow to the degaussing coil to thereby cancel off magnetism of magnetized parts.

Figure 8:
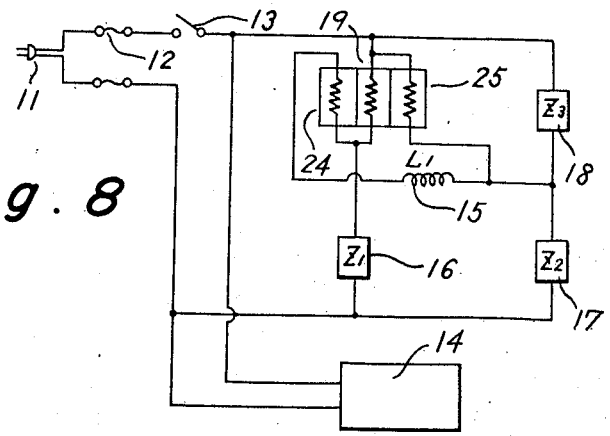

FIGURE 8 shows a circuit in which three compound elements composed of elements 19 and 24 as well as a similar resistor element 25 are arranged or connected together in such a manner as to be able to transmit the heat generated by them to one another. Element 25 is connected in shunt with impedance element 18. It is generally possible to make the parallel impedance of said impedance element 18 and element 25 substantially lower than the impedance of element 19, so that it is possible to make the value of a current flowing through the element 25 higher than the value of a current flowing through the elements 19 and 24. In this instance, the heat generated by the element 25 becomes higher than the heat generated by the elements 19 and 24, the former being transferred to the elements 19 and 24 so that the balancing of the bridge can be achieved quickly.

To facilitate explanation, the element 25 and impedance element 18 are shown as being connected in shunt in FIGURE 8. If proper impedance value were selected, similar results could be achieved by connecting the element 25 in shunt with either impedance element 16 or 17.

Figure 9:
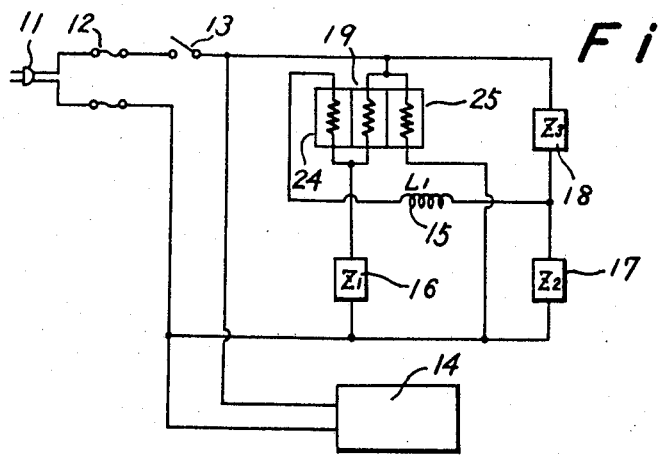

If an input voltage is so arranged as to be applied to opposite ends of the thermal sensitive resistor element of positive characteristics 25 instead of connecting the element 25 in parallel with the impedance element 18 as in the circuit shown in FIGURE 8, the circuit shown in FIGURE 9 can be obtained. In this instance, the element 25 is subjected to an input voltage which is substantially constant at all times and higher than the voltage applied to the thermal sensitive resistor elements 19 and 24, with the result that the heat generated by element 25 is larger in amount than the heat generated by other two elements, so that the former is transmitted to the elements 19 and 24. This causes the resistance values of these elements to be raised, so that the time required for the bridge to reach a steady state can be shortened and at the same time the temperatures of these elements in a steady state can be elevated. This enables the temperatures to be freed from the effects of ambient temperature.

Figure 10:
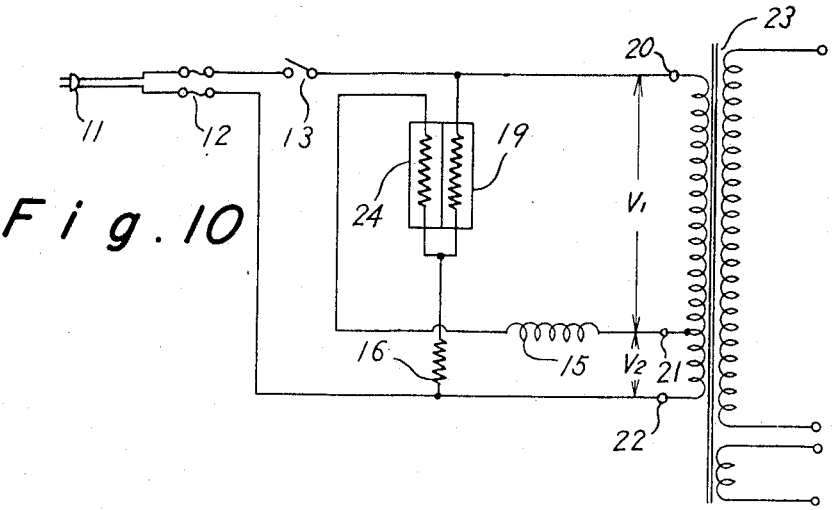
Figure 11:
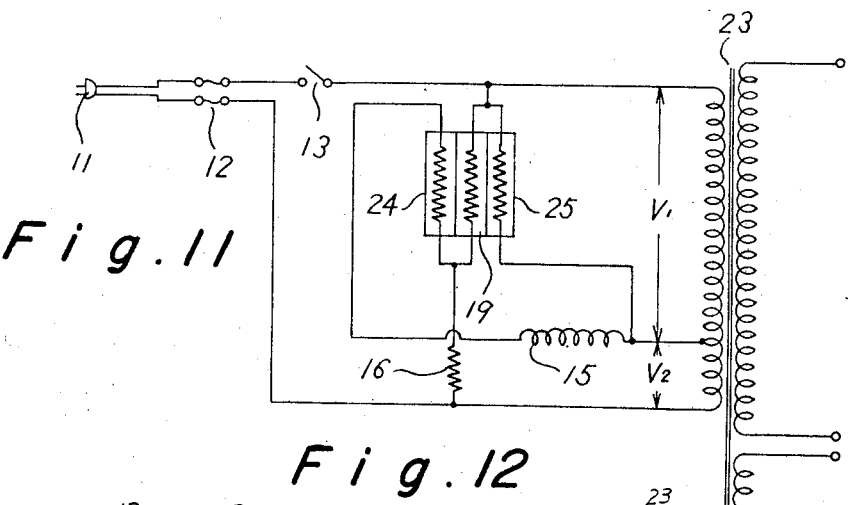
Figure 12:
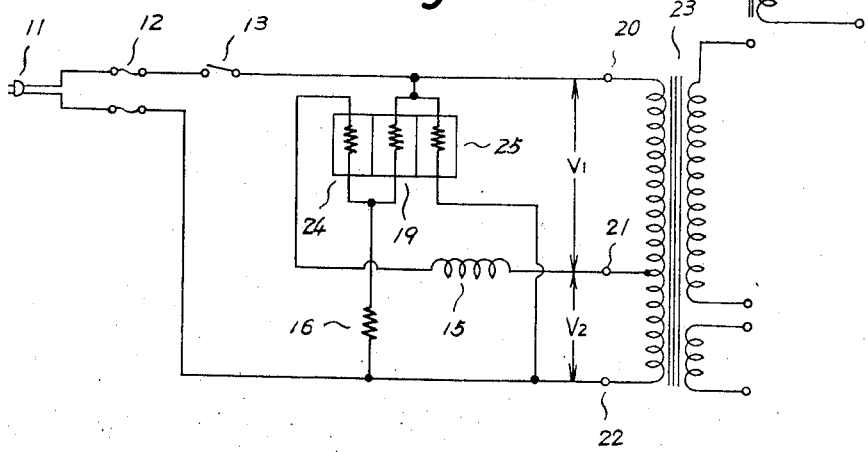

From the description of the circuits shown in FIGURES 7, 8 and 9 and the description of the circuit shown in FIGURE 3, it is evident that the impedance elements 18 and 17 shown in FIGURES 7, 8 and 9 can be replaced by a transformer 23. The circuits shown in FIGURES 10, 11 and 12 can also be used as automatic degaussing apparatus.

Figure 13:
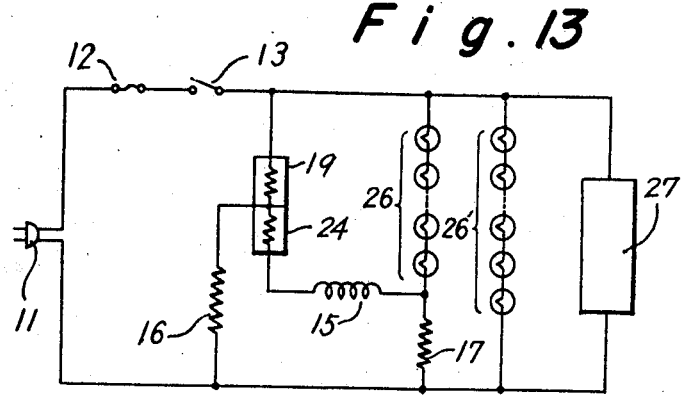

Furthermore, the impedance element 18 or the impedance element 17 in the circuits shown in FIGURES 2, 7 8 and 9 can be replaced by a vacuum tube heater circuit, one example of which is shown in FIGURE 13, wherein 27 generally designates the rectifier circuit of an electric appliance and all the circuits connected thereto, and 26 and 26' are heater circuits for vacuum tubes, the heater circuit 26' being directly connected to a power source and the heater circuit 26 being connected in series with impedance circuit 17.

Upon closing a switch 13 the temperatures of thermal sensitive resistor element 24 and heater circuit 26 rise and reach a predetermined level where they are stabilized by the time an electric appliance, such as a television set, begins its normal operation. This results in the resistance values of them increasing and reaching steady state values, so that proper impedance values for the bridge are set beforehand in such a manner that the bridge becomes stabilized when said resistance values reach steady state values. At the instant that the switch 13 is closed thermal sensitive resistor element of positive characteristics 19 and heater circuit 26 shows a low resistance value because neither of them are heated, especially the former showing a particularly low value because of a great change in resistance due to temperature. Accordingly, the bridge is markedly unbalanced at this time, so that an unbalanced current of a large value flows through degaussing coil 15 connected to the bridge circuit. This current is reduced in value as the bridge becomes almost balanced with time and minimized till the electric appliance is brought to normal operation, thereby effecting degaussing. Description of the operation of thermal sensitive resistor element of positive characteristics 24 shall be omitted since its operation has already been explained with reference to the circuit shown in FIGURE 7.

Figure 14:
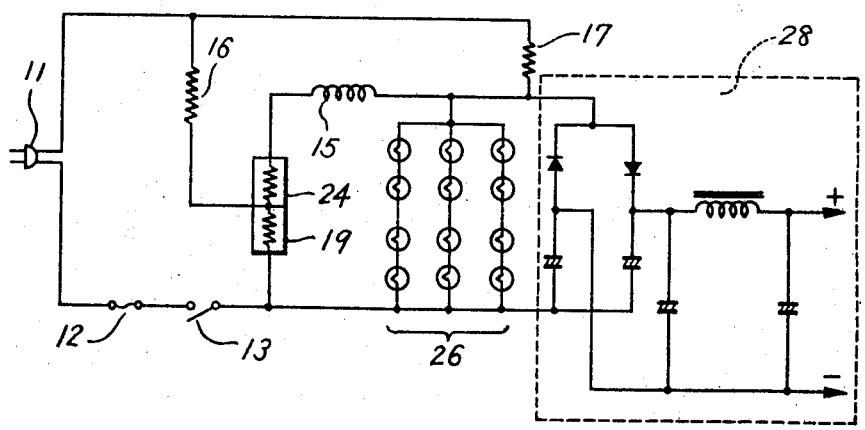

FIGURE 14 shows the other example. In this example, the bridge network comprises not only a heater circuit 26 but also a power source circuit 28 of an electric appliance, for example a television set. The operation of this example is substantially similar to the operation of preceding examples. In this example, upon closing switch 13 a current of large value flowing through the degaussing coil 15 passes through reflector 17, so that the terminal voltage of the power source circuit 28 is lowered. This operates to suppress a surge current of the power source circuit 28.

From the foregoing description, it will be appreciated that according to the present invention a degaussing current is supplied by a bridge network comprising a resistor element or elements having a positive resistance-temperature coefficient and no surge current is used. This frees the degaussing circuit from the influences of a change in the value of a surge current caused as by a change in the design of circuits of an electric appliance. For example, in effecting adjustments of a television set the degaussing circuit can be operated while the screen is filled with raster, so that the effect of degaussing is easier to check.

What I claim is:

1. An automatic degaussing apparatus comprising a bridge circuit composed of a first thermal sensitive resistor element of positive characteristics having a positive and high temperature coefficient, a first heater circuit connected in series with heater terminals of a vacuum tube, and impedances of proper value; a series circuit composed of a degaussing coil mounted between the bridge ends of said bridge circuit and carrying an electric current when said bridge circuit is unbalanced, and a second thermal sensitive resistor element of positive characteristics having a positive and high temperature coefficient; means for supplying a voltage to said bridge circuit; a second heater circuit for a vacuum tube to which said voltage is applied; and means for supplying a voltage for operating electric appliances having magnetized parts to be degaussed; said first thermal sensitive resistor element of positive characteristics and said second thermal sensitive resistor element of positive characteristics being disposed such that the heat generated by them can be transmitted to one another and the value of said impedances being selected such that said bridge circuit is unbalanced for an instant after a voltage is applied thereto but subsequently becomes balanced in a steady state following changes in the impedance of said first thermal sensitive resistor element of positive characteristics.

2. An automatic degaussing apparatus comprising a bridge circuit composed of a first thermal sensitive resistor element of positive characteristics having a positive and high temperature coefficient, a parallel circuit composed of a heater circuit for a vacuum tube and a rectifier circuit for supplying a DC voltage for operating electric appliances having magnetized parts to be degaussed, and impedances of proper value; a series circuit composed of a degaussing coil mounted between the bridge ends of said bridge circuit and carrying an electric current when said bridge circuit is unbalanced and a second thermal sensitive resistor element of positive characteristics; and means for supplying a voltage to said bridge circuit; said first thermal sensitive resistor element of positive characteristics and said second thermal sensitive resistor element of positive characteristics being disposed such that the heat generated by them can be transmitted to one another and the value of said impedances being selected such that said bridge circuit is unbalanced for an instant after a voltage is applied thereto but subsequently becomes balanced in a steady state following changes in the impedance of said first thermal sensitive resistor element of positive characteristics.

3. An automatic degaussing apparatus comprising a bridge circuit having one arm formed by a plurality of serially-connected thermal sensitive resistor elements of positive characteristics having a positive and high temperature coefficient and three arms each having an impedance element; a degaussing coil connected across one diagonal of said bridge circuit for cancelling out magnetism of magnetized objects by carrying an electric current when said bridge circuit is unbalanced; and means for supplying a voltage to said bridge circuit across the other diagonal thereof; said thermal sensitive resistor elements being disposed such that the heat generated by current flowing through them is transmitted to one another; and the impedance of said plurality of serially-connected thermal sensitive resistor elements being selected such that said bridge circuit is unbalanced for an instant after a voltage is applied thereto but becomes balanced in a steady state through changes occurring in the impedance of said plurality of serially-connected thermal sensitive resistor elements.

4. An automatic degaussing apparatus as claimed in claim 3 further comprising an AC transformer one winding of which forms at least one of said three arms of said bridge circuit, said AC transformer supplying a voltage required for operating electric appliances having magnetized parts to be degaussed.

5. An automatic degaussing apparatus comprising a bridge circuit having one arm formed by a first thermal sensitive resistor element of positive characteristics having a positive and high temperature coefficient and three arms each having an impedance element, a series circuit of a second thermal sensitive resistor element of positive characteristics and a degaussing coil connected across one diagonal of said bridge circuit for cancelling out magnetism of magnetized objects by carrying an electric current when said bridge circuit is unbalanced, and means for supplying a voltage to said bridge circuit across the other diagonal thereof, said first and second thermal sensitive resistor elements being disposed such that the heat generated by current flowing through them is transmitted to one another, the impedance of said first thermal sensitive resistor element being selected such that said bridge circuit is unbalanced for an instant after a voltage is applied thereto but becomes balanced in a steady state through changes occurring in the impedance of said first thermal sensitive resistor element.

6. An automatic degaussing apparatus as claimed in claim 5 further comprising an AC transformer one winding of which forms at least one of said three arms of said bridge circuit, said AC transformer supplying a voltage required for operating electric appliances having magnetized parts to be degaussed.

7. An automatic degaussing apparatus as claimed in claim 5 further comprising a second thermal sensitive resistor element of positive characteristics connected in shunt with a suitable one of said impedances of said bridge circuit; a series circuit composed of said degaussing coil and a third thermal sensitive resistor element of positive characteristics; said first, second and third thermal sensitive resistors of positive characteristics being disposed such that the heat generated by them is transmitted to one another.

8. An automatic degaussing apparatus as claimed in claim 7 in which said bridge circuit further comprises a winding of an AC transformer, said AC transformer supplying a voltage required for operating electric appliances having magnetized parts to be degaussed.

9. An automatic degaussing apparatus as claimed in claim 5 further comprising a series circuit composed of said degaussing coil and a second thermal sensitive resistor element of positive characteristics having a positive and high temperature coefficient, and a third thermal sensitive resistor element of positive characteristics having a positive and high temperature coefficient to which said voltage is applied, said first, second and third thermal sensitive resistor elements of positive characteristics being disposed such that the heat generated by them is transmitted to one another.

10. An automatic degaussing apparatus as claimed in claim 9 in which said bridge circuit further comprises a winding of an AC transformer, said AC transformer supplying a voltage required for operating electric appliances having magnetized parts to be degaussed.

11. An automatic degaussing apparatus as claimed in claim 5 in which said bridge circuit further comprises a winding of an AC transformer, said AC transformer supplying a voltage required for operating electric appliances having magnetized parts to be degaussed.

12. An automatic degaussing apparatus as claimed in claim 5 in which said bridge circuit further comprises a heater circuit for vacuum tubes.

References Cited

UNITED STATES PATENTS

| | | | |
|---|---|---|---|
| 2,528,446 | 10/1950 | McConnell | 317—157.5 XR |
| 2,832,041 | 4/1958 | Trachtenberg | 317—157.5 XR |
| 3,350,609 | 10/1967 | Steele | 317—157.5 XR |

LEE T. HIX, Primary Examiner

W. H. SHOOP, JR., Assistant Examiner